United States Patent [19]
Mauck

[11] 3,733,084
[45] May 15, 1973

[54] TRAILER CONSTRUCTION

[76] Inventor: Robert J. Mauck, 2252 Pinconning Road, Pinconning, Mich. 48650

[22] Filed: Dec. 9, 1971

[21] Appl. No.: 206,254

[52] U.S. Cl. ............. 280/81.5, 280/DIG. 9, 280/445
[51] Int. Cl. ............................................. B62d 53/00
[58] Field of Search ............... 280/81.5, 81 A, 81 B, 280/81 R, DIG. 9

[56] References Cited

UNITED STATES PATENTS

| | | | |
|---|---|---|---|
| 2,395,640 | 2/1946 | Pearson | 280/81 R |
| 2,919,928 | 1/1960 | Hoffer | 280/81 R |
| 3,334,912 | 8/1967 | Mauck | 280/81 R |

FOREIGN PATENTS OR APPLICATIONS

| | | | |
|---|---|---|---|
| 1,013,587 | 4/1952 | France | 280/81 A |

*Primary Examiner*—Leo Friaglia
*Attorney*—John H. Bishop et al.

[57] ABSTRACT

A trailer construction including three wheel assemblies each comprising two independent sets of wheels. Each independent set of wheels is pivotally connected to the trailer bed and the two independent sets of wheels in each wheel assembly are connected together by links so as to operate in unison. Lock means is provided for optionally locking the individual sets of wheels of the central wheel assembly only, in a straight path, while the trailer is moving forward. Floating wheels are provided at the pivot points of the sets of wheels and lock means is provided for optionally locking certain of said floating wheels to the auxiliary frames of the corresponding wheel sets. Said certain floating wheels are connected together to rotate in unison. Air cylinders are controlled by the tractor operator for simultaneously moving all three wheel assemblies in the same direction for steering the trailer when it is moved in reverse.

9 Claims, 16 Drawing Figures

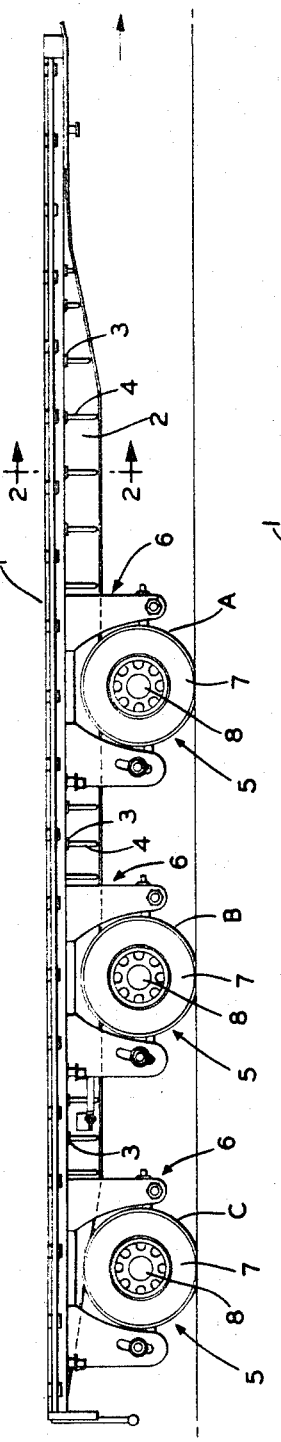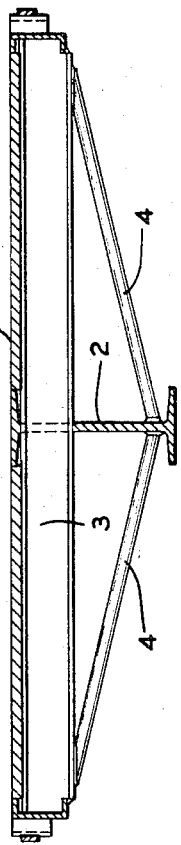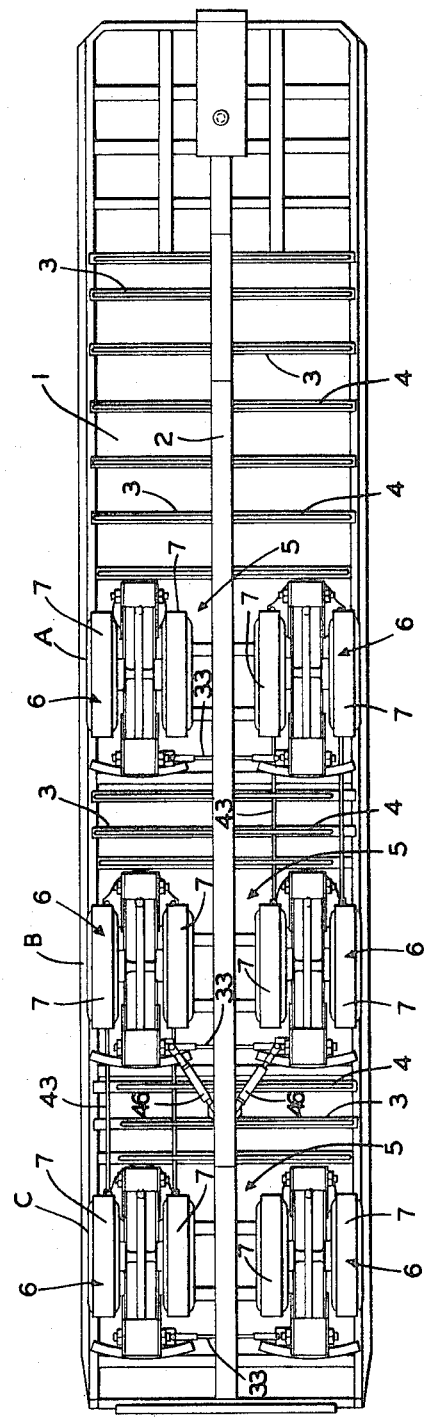

INVENTOR
ROBERT J. MAUCK

Frease & Bishop
ATTORNEY

INVENTOR
ROBERT J. MAUCK

INVENTOR
ROBERT J. MAUCK
BY
Frease & Bishop
ATTORNEY

TRAILER CONSTRUCTION

BACKGROUND OF THE INVENTION

Field of the Invention

The invention relates to improvements in trailer construction having a plurality of three wheel assemblies with means for operating the same in one manner when the trailer is moving forward and in another manner when the trailer is moving in reverse.

Description of the Prior Art

This invention is an improvement upon the construction disclosed in U.S. Pat. No. 3,334,912 issued Aug. 8, 1967.

SUMMARY OF THE INVENTION

In general terms, the trailer construction comprising the present invention may be briefly described as including a main frame comprising a central longitudinally disposed main beam depending from the trailer bed with a plurality of laterally disposed cross beams located through the upper portion of the web thereof.

Longitudinally spaced front, intermediate and rear wheel assemblies are provided for supporting the trailer. Each of these wheel assemblies is formed by generally axially aligned, laterally spaced sets of generally axially aligned, laterally spaced wheels, with axle means extending laterally between the wheels of each set for rotatably supporting the wheels.

A floating wheel is provided for each independent set of wheels in each wheel assembly. Each set of wheels is mounted pivotal around a generally perpendicular axis relative to the trailer bed.

The two independent sets of wheels in each wheel assembly are connected together as by links so as to operate in unison. The intermediate wheel assembly is adapted to be locked with the wheels in a straight path by means of a spring tension lock which may be released by air. This intermediate wheel assembly is held in this locked position while the trailer is moving forward.

The floating wheel of one independent set of the intermediate wheel assembly is connected by links or the like to the corresponding floating wheel of the front wheel assembly, and in like manner the floating wheel of the other independent wheel set of the intermediate wheel assembly is connected as by links to the corresponding floating wheel of the rear wheel assembly.

Air cylinders are provided for simultaneously moving all three wheel assemblies in the same direction when the trailer is moved in reverse. These air cylinders may be pivotally connected at opposite ends to the main beam and to the housings of both independent sets of wheels in the intermediate wheel assembly or, alternatively, the cylinders may be pivotally connected at opposite ends to one of the links connecting the floating wheels to one of the cross beams.

A spring lock, releasable by air, is provided for optionally locking or unlocking one floating wheel of each wheel assembly.

The object of the invention is to provide an improved vehicle wheel support for trailers which may be easily and readily operated for moving a trailer forward either in a straight path or around curves and for moving the trailer in reverse controlled by the tractor operator to steer the trailer for easy parking and around curves.

Another object of the invention is to provide a trailer construction in which the axles are positioned back of the turning center of each set of wheels for self-steering action when moving forward.

A further object of the invention is to provide a floating wheel for each independent set of wheels, means for locking certain of the floating wheels to the corresponding sets of wheels, links connecting the wheels of each set, and links connecting the floating wheels of the several wheel assemblies.

It is also an object of the invention to provide an improved trailer construction which satisfies the above objects in a relatively simple and efficient manner and may be provided at a minimum cost.

The above objects together with others which will be apparent from the drawings and following description, or which may be later referred to, may be attained by constructing the improved trailer construction, in the manner hereinafter described in detail and illustrated in the accompanying drawings.

BRIEF DESCRIPTION OF THE DRAWINGS

By way of example, an embodiment of the invention is illustrated in the accompanying drawings forming a part hereof, wherein similar numerals indicate similar parts throughout the several views.

FIG. 1 is a side elevation of a trailer embodying the invention;

FIG. 2 is an enlarged transverse sectional view on the line 2—2, FIG. 1;

FIG. 3 is a bottom plan view of the trailer;

DESCRIPTION OF THE PREFERRED EMBODIMENT

Figure 5:
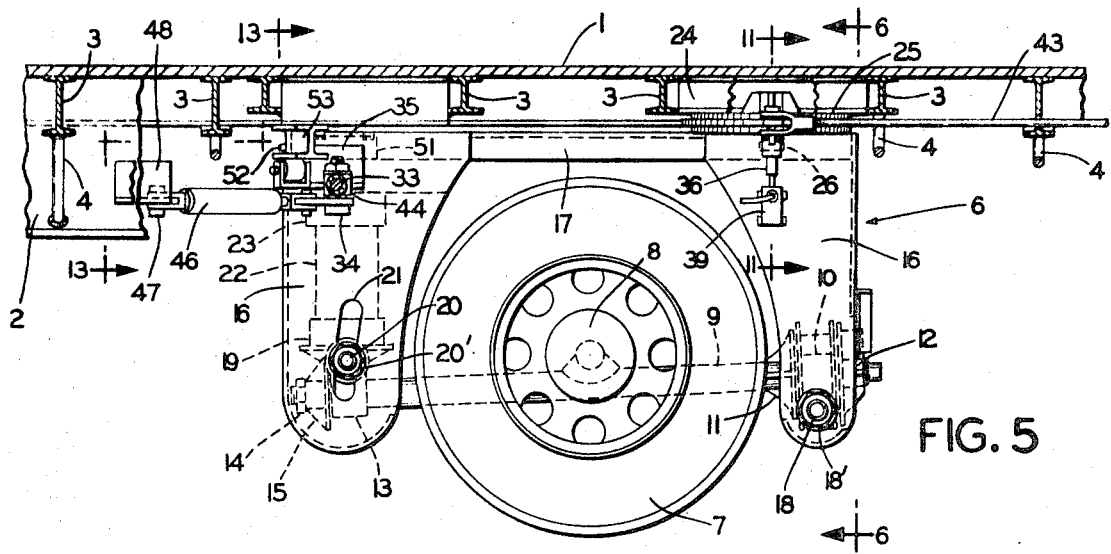
FIG. 5 is a longitudinal section on the line 5—5, FIG. 4.
Figure 4:
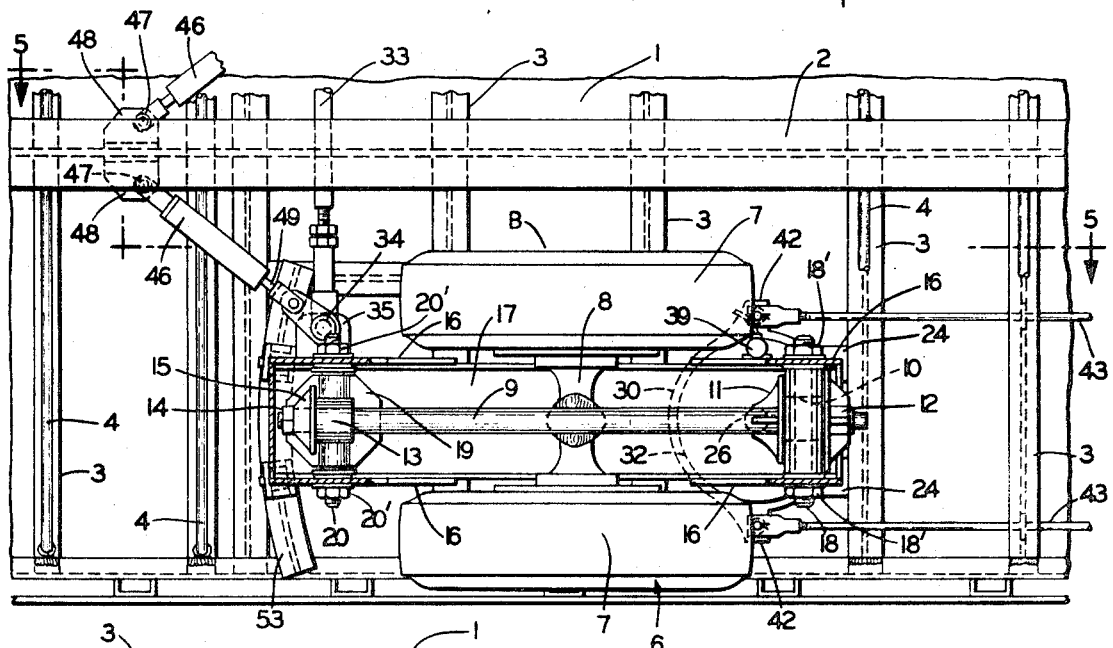
FIG. 4 is an enlarged fragmentary bottom plan view of a portion of the trailer showing one of the sets of wheels of the intermediate wheel assembly, with parts broken away.
Figure 6:
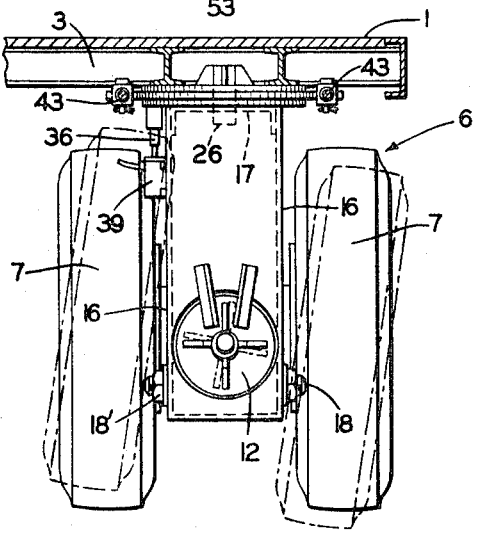
FIG. 6 is a transverse section on the line 6—6, FIG. 5.
Figure 7:
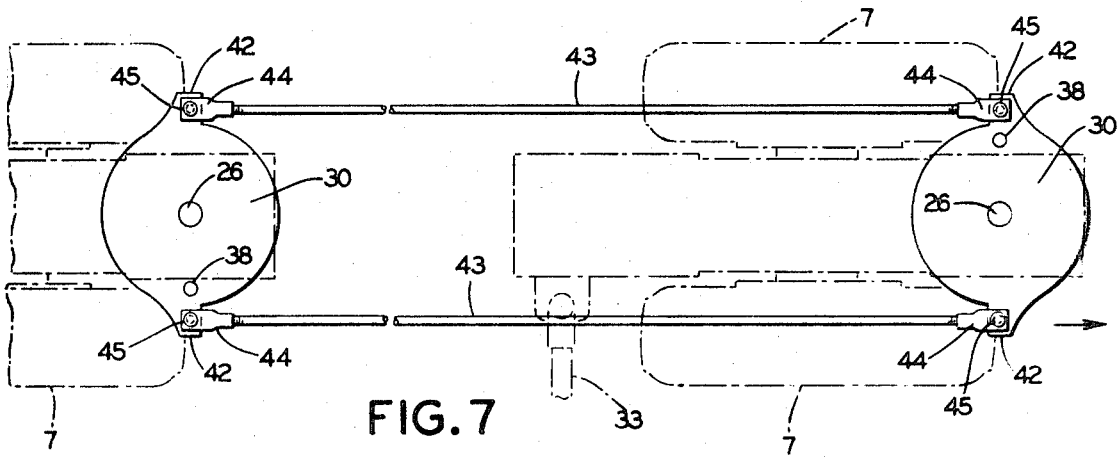
FIG. 7 is a fragmentary top plan view of one of the sets of wheels of the front wheel assembly connected by links or rods to the corresponding set of wheels of the intermediate wheel assembly.
Figure 8:
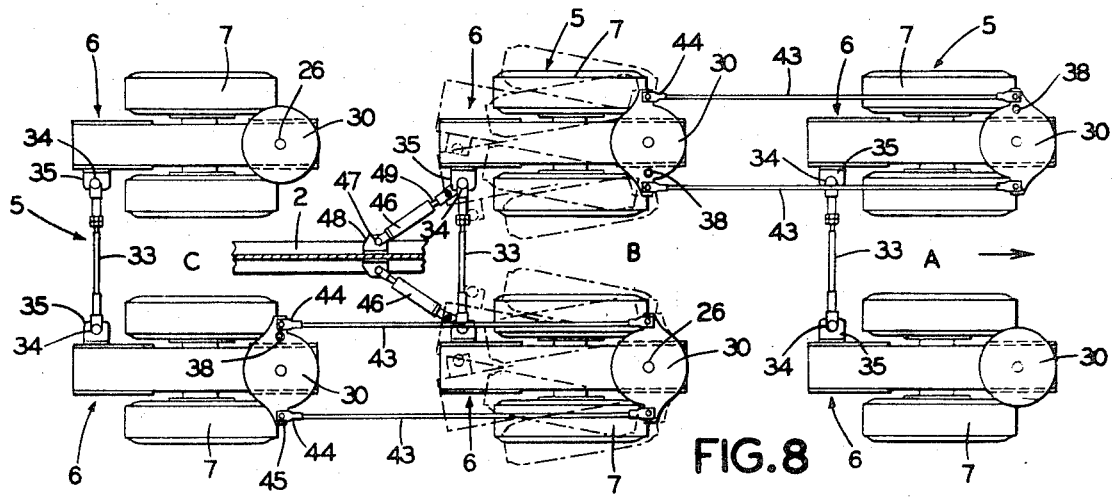
FIG. 8 is a top plan sectional view of the three wheel assemblies showing the connecting linkage.

The illustrated embodiment of the improved trailer construction includes a usual trailer bed 1 supported upon a main frame comprising the central longitudinal main beam 2 and the cross beams 3 located through the upper portion of the main beam. Upon this trailer bed may be provided any conventional form of trailer construction.

Struts 4 are downwardly and inwardly inclined from the ends of the cross beams 3 to the lower portion of the main beam 2.

The trailer main frame and bed are supported by three similar wheel assemblies 5. The three wheel assemblies comprise the front assembly A, the intermediate assembly B, and the rear assembly C. Each of these front, intermediate and rear wheel assemblies is formed by axially aligned and laterally spaced sets 6 of axially aligned and laterally spaced wheels 7.

Each set 6 of wheels is mounted pivotal in a generally vertical plane about a generally longitudinal pivot axis relative to the main frame.

Also, each set 6 of wheels in each of said wheel assemblies is operatively connected to the main frame for pivotal movement of each individual set 6 in a generally horizontal plane about a generally vertical axis.

Referring particularly to FIGS. 1, 3 to 7, and 11 to 13, each set of wheels of each of the wheel assemblies is formed by the axially aligned and laterally spaced wheels 7 mounted on the laterally extending axle 8, which is, in turn, secured to a longitudinal central portion of the longitudinally extending support shaft 9.

The forward end of the support shaft 9 is rotatably mounted in the forward support sleeve 10 and secured therein by the stop flange 11 and nut 12. The rear end of the support shaft 9 is slidably and rotatably received in the rear support sleeve 13, and a nut 14 with stop flange 15 thereon is threaded upon the rear end of the support shaft 9.

The support shaft 9 and the forward and rear support sleeves 10 and 13, respectively, are positioned generally laterally between the vertically and longitudinally extending auxiliary frame plates 16, which are connected to the longitudinal auxiliary frame member 17.

The forward support sleeve 10 is pivotally secured, at a point spaced forwardly of the wheel axle 8, to the auxiliary frame plates 16 by means of a lower projection receiving the pivot bolt 18 pivotally and laterally therethrough.

The pivot bolt 18 is mounted laterally through a lower portion of the forward auxiliary frame plates 16, and nuts 18' are mounted upon the ends thereof. The rear support sleeve 13 is pivotally secured about a generally lateral axis to the lower cap 19 through an upward projection which receives the laterally extending pivot bolt 20.

The outer ends of the pivot bolt 20 are received laterally through the rear auxiliary frame plates 16 and secured by the nuts 20', with the pivot bolt 20 being generally vertically movable relative to the auxiliary frame plates 16 in the generally vertically extending slots 21 formed in the rear auxiliary frame plates 16.

The lower end of an air bag 22, in lieu of the conventional coil spring, is received downwardly within the lower cap 19, with the air bag 22 extending generally vertically upwardly, laterally between the rear auxiliary frame plates 16 and having its upper end received within the upper cap 23 located at the upper ends of the rear auxiliary frame plates 16.

Thus, the pivotal movement of the forward support sleeve 10, and thereby the wheels 7, axle 8, and support shaft 9, in a generally vertical plane about the generally lateral axis formed through the pivot bolt 18, is resiliently resisted by the air bag 22 between the rearward support sleeve 13 and the upper cap 23 at the upper portion of the rear auxiliary frame plates 16, in the same manner as the intermediate and rear wheel assemblies in said U.S. Pat. No. 3,334,912.

Figure 11:
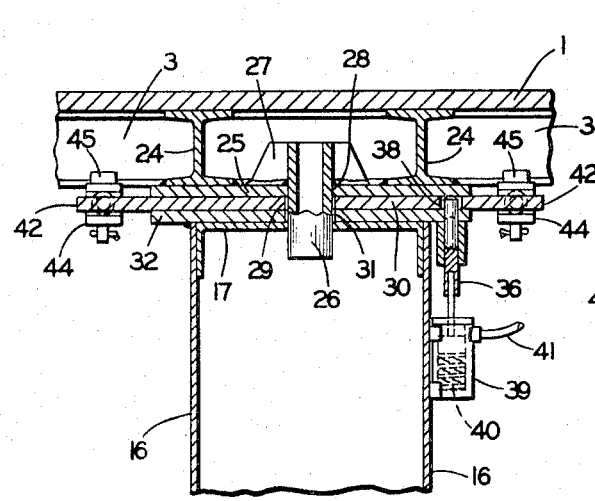
FIG. 11 is a fragmentary section on the line 11—11, FIG. 5, showing the floating wheel locked.
Figure 12:
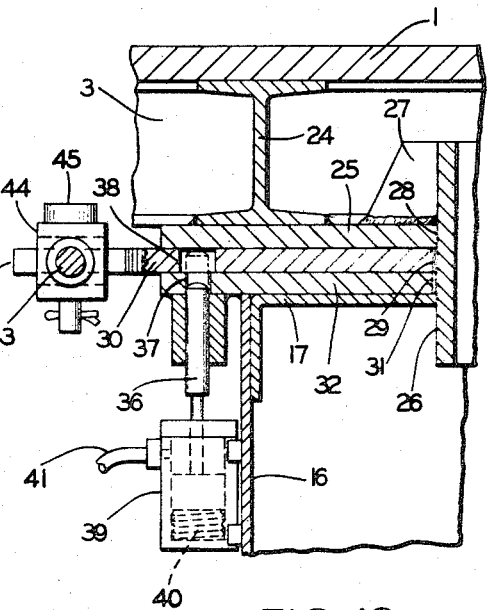
FIG. 12 is an enlarged fragmentary sectional view showing the floating wheel unlocked.
Figure 13:
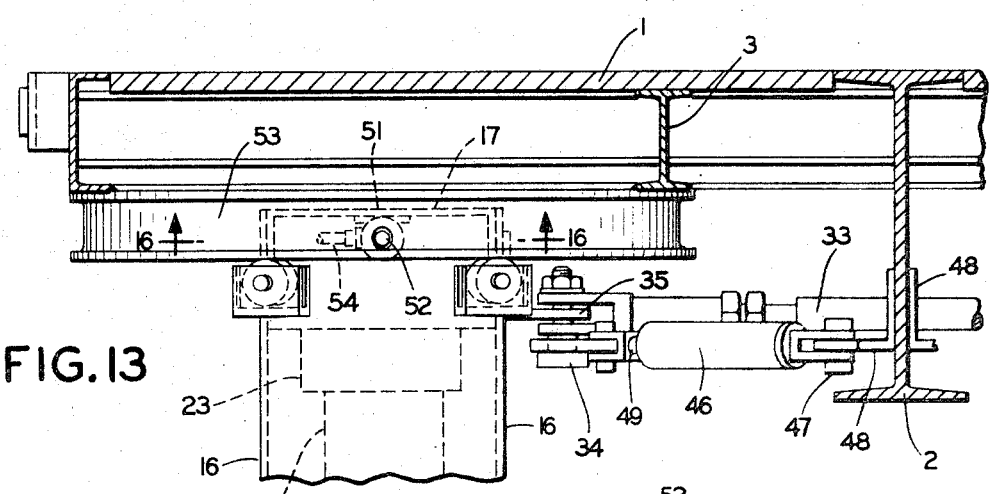
FIG. 13 is a fragmentary section on the line 13—13, FIG. 5.

At properly spaced points in the main frame, longitudinally disposed beams 24 are located between two adjacent cross beams 3 and secured thereto in any suitable manner. A disc plate 25 is rigidly attached to the lower flanges of the beams 24 and has centrally located therethrough a pivot pin 26 which may be tubular as shown in FIGS. 11 and 12.

A plurality of radial flanges 27 upon the upper end of the pivot pin 26 are welded or otherwise attached to the stationary disc plate 25. The lower portion of the pivot pin 26 extends down through the central opening 28 in the stationary disc 25, through a central opening 29 in the floating wheel 30, and through a central opening 31 in the disc 32, which is welded or otherwise suitably attached to the longitudinal auxiliary frame member 17, and the upper ends of the auxiliary frame plates 16.

Each independent set 6 of wheels may thus be pivotally connected to the main frame of the trailer bed at its forward end. The sets 6 of wheels forming each wheel assembly 5 are connected together so as to be moved upon their pivots in unison.

For this purpose, links 33 are provided for connecting the rear end portions of the sets 6 of wheels forming each wheel assembly 5. Opposite ends of each link 33 are pivotally connected, by pivot bolts 34, to lugs 35 fixed to opposed faces of the rear auxiliary frame plates 16 of the two wheel sets 6 forming each wheel assembly 5.

Lock means is provided for optionally locking one set 6 of wheels of each wheel assembly 5 to the corresponding floating wheel 30. For this purpose, a plunger or locking bolt 36 is adapted to be inserted through the aperture 37 of the disc 32 into the aperture 38 of the corresponding floating wheel 30.

The plunger 36 may be the piston rod of a cylinder 39 mounted on the adjacent auxiliary frame plate 16. A compression spring 40 in the cylinder 39 may normally hold the plunger 36 in extended or locked position as shown in FIG. 11. The plunger may be retracted to unlocked position, as shown in FIG. 12, by fluid pressure admitted through hose 41.

The floating wheel 30 of one set 6 of wheels of the intermediate wheel assembly B is connected to the floating wheel of the corresponding set of wheels in the front wheel assembly A and in like manner the floating wheel of the other set of wheels in the intermediate wheel assembly B is connected to the floating wheel of the corresponding set of wheels in the rear wheel assembly C.

As best shown in FIGS. 7 to 10 inclusive, this may be accomplished by providing diametrically opposite ears 42 upon these floating wheels 30 and pivotally connecting links in the form of rods 43 to said ears. A bifurcated member 44 is threaded upon each end of each rod 43 and pivotally connected to the corresponding ear 42 by a pin 45. Since the bifurcated members 44 are threaded upon the ends of the rods 43 this provides for quick and easy adjustment of the length of the rods to accommodate the spacing between the floating wheels so connected.

In order to provide means whereby the operator may control the steering of the trailer, particularly in reverse, fluid operated cylinders 46 are provided and adapted to be controlled by the operator. Each of these cylinders is pivotally connected at one end, as indicated at 47, to a lug 48 attached to or formed upon the main beam 2, the piston rod 49 thereof being connected to one of the sets 6 of wheels in the intermediate wheel assembly B, as by the pivot pin 34.

Means is provided for optionally locking the wheels of the intermediate wheel assembly B in a straight path. As shown in FIGS. 5 and 16, this may be a locking assembly such as shown at 102 in FIGS. 10 and 15 of U.S. Pat. No. 3,334,912, above referred to. Such a locking assembly is indicated generally at 50 in FIGS. 4 and 16 and comprises cylinder 51 mounted at the rear end of the auxiliary frame of one set 6 of wheels of the intermediate wheel assembly B.

Since both sets of wheels in the assembly are connected by a link 33, both sets of wheels in the intermediate wheel assembly B may be locked by this locking assembly. The lock bolt 52, which is selectively extendable from the cylinder, is engageable through a suitable opening in the arcuate beam 53. This lock bolt may be normally extended by spring means in the manner of the lock bolt 36 in the cylinder 39 and retracted by fluid pressure through a hose 54.

Figure 10:
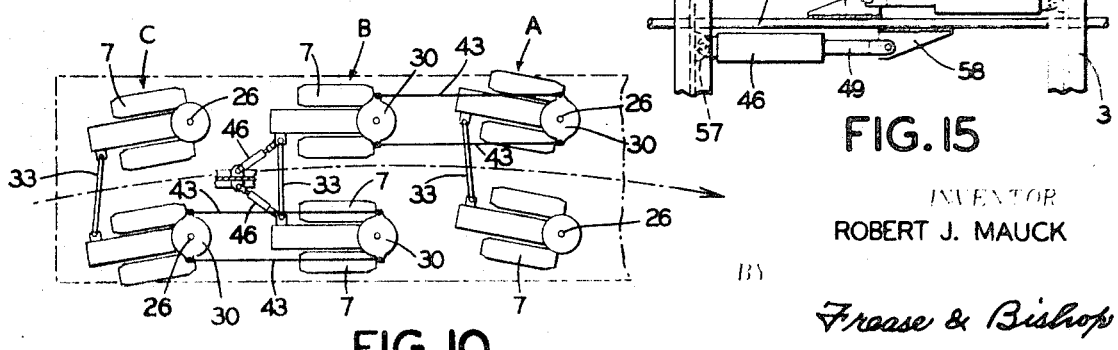
FIG. 10 is a similar view showing the position of the wheels when moving the trailer forward around a curve.

When the trailer is moving forward the intermediate wheel assembly B may be locked by the locking assembly 50 with the wheels 7 thereof in a straight path, as indicated in FIG. 10. The piston rods or lock bolts 36 of the cylinders 39 may be retracted so that the front wheel assembly A and rear wheel assembly C are free to pivot upon their pivot pins 26 so that their wheels may follow the path of the tractor in passing around curves and the like, as indicated in FIG. 10.

When it is desired to move the trailer in reverse, the locking bolt 52 is retracted and the locking bolts or piston rods 36 of the cylinders 39 are extended into the apertures 38 of certain of the floating wheels 30, connecting the individual wheel sets 6 to their respective floating wheels 30.

Figure 9:
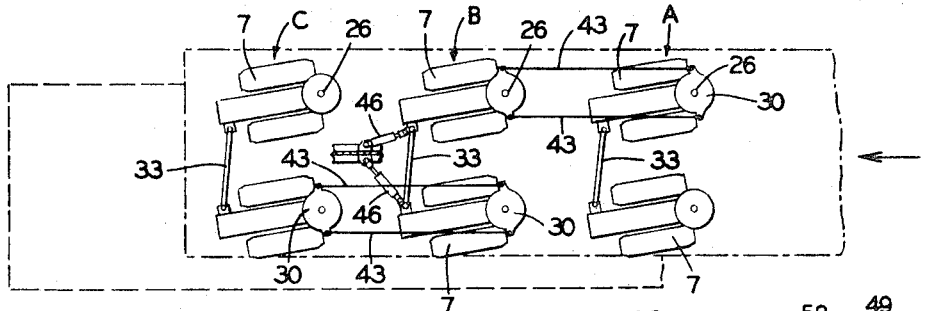
FIG. 9 is a small scale diagrammatic view showing the position of the wheels when backing the trailer around a curve.

The operator then operates the cylinder 46 to move the wheels of the intermediate wheel assembly B to the desired position. Through the rods 43 and links 33 the wheels 7 of the front wheel assembly A and rear assembly C will be moved to the same positions so that the operator may control the steering of the tractor in reverse, as shown in FIG. 9.

Figure 14:
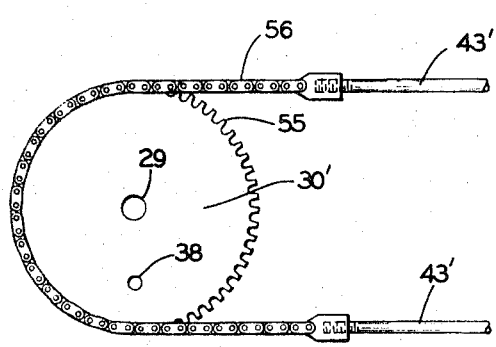
FIG. 14 is a fragmentary plan view showing a modified form of sprocket and chain for connecting the floating wheels of the intermediate and front wheels or intermediate and rear wheels.

In FIG. 14 is shown a modification in which certain of the floating wheels 30' instead of being provided with ears for pivotal connection of rods 43, are in the form of sprocket wheels with sprocket teeth 55 around their peripheries. The rods 43' are connected together in pairs at opposite ends by sprocket chains 56 which engage the sprocket teeth 55.

Figure 15:
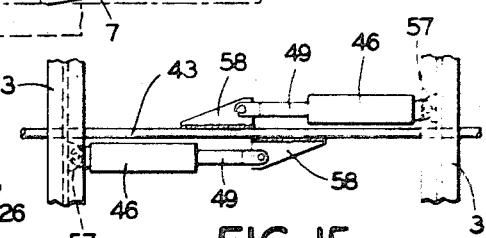
FIG. 15 is a fragmentary plan view showing a modified arrangement of air cylinders.
Figure 16:
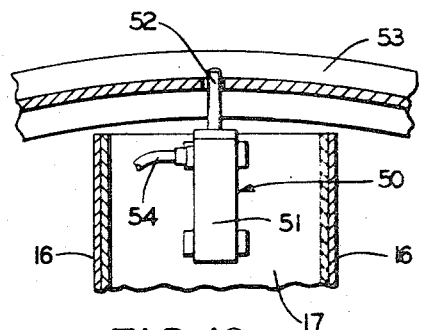
FIG. 16 is an enlarged fragmentary sectional view on the line 16—16, FIG. 13.

In FIG. 15 is shown a modification of the cylinder 46. Instead of connecting these cylinders and their piston rods to the auxiliary frame plates 16 and the main beam 2, respectively, the cylinders are pivotally connected to ears 57 on cross beams 3, and the piston rods 49 are connected to ears 58 upon the rods 43. This will enable a choice of either location to the user.

In the foregoing description certain terms have been used for gravity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of the preferred embodiments thereof, and the advantageous, new and useful results obtained thereby; the new and useful construction, and reasonable mechanical equivalents thereof obvious to those skilled in the art, are set forth in the disclosure.

I claim:

1. Trailer construction including a main frame, longitudinally spaced supporting front, intermediate and rear wheel assemblies, each wheel assembly having generally axially aligned laterally spaced sets of generally axially aligned laterally spaced wheels, an auxiliary frame for each of said sets of wheels, vertical pivot means for pivotally mounting the front end portion of each auxiliary frame to the main frame, means connecting the rear end portions of the auxiliary frames of each wheel assembly together, means for locking the sets of wheels of the intermediate wheel assembly with the wheels in a straight path for forward movement of the trailer, and means controlled by the operator for controlling the pivotal movement of all of the sets of wheels for steering the trailer when moving in reverse.

2. Trailer construction as defined in claim 1 in which the means connecting the rear end portion of the auxiliary frames of each wheel assembly comprises a tie rod pivotally connected at opposite ends to said auxiliary frames.

3. Trailer construction as defined in claim 1 in which a floating wheel is pivotally mounted upon the vertical pivot means of certain auxiliary frames, means is provided for locking one floating wheel in each wheel assembly to the corresponding auxiliary frame, and means is provided for connecting one floating wheel of the intermediate wheel assembly to the corresponding floating wheel of the front wheel assembly and for connecting the other floating wheel of the intermediate wheel assembly with the corresponding floating wheel of the rear wheel assembly.

4. Trailer construction as defined in claim 1 in which the means for locking the sets of wheels of the intermediate wheel assembly with the wheels in a straight path comprises a cylinder operated lock bolt on one of said sets of wheels for engagement in an aperture in an arcuate beam on said main frame.

5. Trailer construction as defined in claim 1 in which the means controlled by the operator for controlling the pivotal movement of all of the sets of wheels for steering the trailer when moving in reverse includes manually controlled fluid cylinder means interposed between the main frame and the sets of wheels of the intermediate wheel assembly.

6. Trailer construction as defined in claim 1 in which the main frame comprises a central longitudinally disposed main beam and a plurality of transversely disposed cross beams located through the upper portion of the main beam.

7. Trailer construction as defined in claim 3 in which the means for connecting the floating wheels of the intermediate, front and rear wheel assemblies comprises rods pivotally connected at their ends to the peripheral portions of the floating wheels.

8. Trailer construction as defined in claim 3 in which said floating wheels have sprocket teeth around their peripheries, sprocket chains are located around the same and means connects the ends of each sprocket chain to the ends of the corresponding sprocket chains.

9. Trailer construction as defined in claim 3 in which manually controlled fluid cylinder means is interposed between the main frame and the sets of wheels of the intermediate wheel assembly.

* * * * *